United States Patent [19]
Konishi

[11] Patent Number: 5,204,122
[45] Date of Patent: Apr. 20, 1993

[54] MOLD FOR USE IN RESIN ENCAPSULATION MOLDING

[75] Inventor: Akira Konishi, Kyoto, Japan

[73] Assignee: Dai-Ichi Seiko Co., Ltd., Kyoto, Japan

[21] Appl. No.: 824,646

[22] Filed: Jan. 23, 1992

[51] Int. Cl.⁵ .................. B29C 45/02; B29C 45/18
[52] U.S. Cl. .................. 425/116; 249/110;
249/95; 264/272.170; 425/544; 425/588;
425/DIG. 228
[58] Field of Search .......... 264/272.17; 425/116,
425/121, 129.1, 588, 572, 256, 544, DIG. 228;
249/110, 95

[56] References Cited

U.S. PATENT DOCUMENTS

| | | | |
|---|---|---|---|
| 2,476,558 | 7/1949 | Moxness | 425/572 |
| 3,764,248 | 10/1973 | Hall | 425/588 |
| 4,900,485 | 2/1990 | Murakami | 264/272.17 |

FOREIGN PATENT DOCUMENTS

| | | | |
|---|---|---|---|
| 53-143656 | 8/1978 | Japan | 264/272.17 |
| 61-131534 | 6/1986 | Japan | 425/544 |
| 62-184821 | 8/1987 | Japan | 425/544 |

Primary Examiner—Jay H. Woo
Assistant Examiner—Khanh P. Nguyen
Attorney, Agent, or Firm—Lowe, Price, LeBlanc & Becker

[57] ABSTRACT

A mold system for use in resin encapsulation molding includes a cavity serving as a resin molding section in which small size electric elements such as semiconductor devices and electrical parts are encapsulated with a synthetic resin. The system also incudes at least one pot for receiving the synthetic resin material and melting the received synthetic resin material by heating, a cull section communicating with the pot and formed facing to an opening end face, and a conveying passage for communicating the cull section and the cavity to convey molten resin material through the cull section. The synthetic resin material is placed in the cavity and is heated to melt therein, and is extruded out of the pot by a plunger disposed in an axial direction of the pot. The inner bottom of the cull section facing to the opening end face of the pot is formed unevenly.

11 Claims, 3 Drawing Sheets

MOLD FOR USE IN RESIN ENCAPSULATION MOLDING

BACKGROUND OF THE INVENTION

1. Field of the Invention

The present invention relates to a mold for use in resin encapsulation molding of small size electrical elements such as semiconductors, various electrical parts, etc. with synthetic resin.

2. Background of the Prior Art

Generally, small size electrical parts such as integrated circuit (IC), large scale integrated circuit (LSI), transistor and the like have been packaged with thermoplastic resins such as phenol resin, epoxy resin, etc. to form a packaged product. This packaging work is performed in mass-production scale by employing a transfer molding press in which a mold for resin encapsulation molding comprising a male mold and a female mold is set. The mold for resin encapsulation molding employed in this work comprises a cavity serving as a resin molding section in which small size electrical elements such as semiconductor devices, electrical parts are encapsulated with a synthetic resin material; a pot for receiving the synthetic resin material and melting the received synthetic resin material by heating; a cull section formed on either a female mold or an male mold which is a counter mold of either the male mold or the female mold on which said pot is formed, in such a manner as to face to an open end face of the pot; and a conveying passage for conveying the molten resin material through which said cull section and said cavity are communicated. Operation of the mold of above construction comprises the steps of placing a small size electical element in the cavity of the mold; clamping the male and female molds; placing the synthetic resin material of tablet shape in the pot and melting the resin material by heating; extruding the molten resin material out of the pot by a plunger disposed slidably in the pot in axial direction; conveying the extruded resin material through the conveying passage by way of the cull section; injecting the conveyed resin material in the cavity under pressure; and curing the injected resin material by heating; thus a product of resin molded small size electrical elements being obtained.

FIG. 8 is a partially enlarged longitudinal view of a mold according to the prior art, and in which reference numeral 1 denotes a male mold, and numeral 2 denotes a female mold. A pot 3 is formed on the female mold 2 in this example, and a cull section 4 is formed on the male mold 1 facing to the upper end face of the pot 3. Runners 5, 5' are respectively formed on the male mold 1 and female mold 2 in connection with the cull section 4. At the tip end of the runner 5', a cavity 7 is formed both on the male mold 1 and the female mold 2 so as to communicate with the runner 5' through a gate 6. Disposed in the pot 3 formed on the female mold 2 is a plunger 8 which is reciprocatingly moved up and down to slidably in the axial direction by a drive source not illustrated, whereby immediately after melting a resin tablet 9 placed in the pot 3 by heating, the molten resin material is extruded out of the pot 3 by the plunger 8 so that the molten resin material may be injected under pressure in the cavity 7 through the cull section 4 and runners 5, 5' by way of the gate 6.

A serious problem, however, exists in that when performing the mentioned molding process employing the conventional mold for resin encapsulation molding, the tablet-shaped synthetic resin material cannot be smoothly and evenly molten in the pot. More specifically, the male mold 1 and female mold 2 are heated in the form of thermal conduction from a heater (not illustrated) embedded in male mold plate and female mold plate, and the resin tablet 9 is molten sequentially starting from its upper and lower ends being in contact with the cull section 4 and plunger 8, getting through the steps of placing the resin tablet 9 in the pot, melting the placed resin tablet 9 and injecting the molten resin in the cavity 7. In other words, first the part "a" being in contact with the cull section 4 heated to the highest temperature begins to melt, then a part "c" being in contact with the upper end face of the plunger heated to a temperature a little lower than the cull section 4 begins to melt, and finally a part "b" not being in contact with any part of the mold and plunger comes to melt. In this manner, the synthetic resin material transformed sequentially into a fluid state due to such sequential melting by heating is extruded out of the pot 3, passing through the cull section 4, and flows in the runners 5, 5', through which finally flows in the cavity 7.

Because of the mentioned resin melting process taking place stepwise, the molten state of the synthetic resin material flowing in the cavity from the cull section through the runners and gate becomes unavoidably uneven, and therefore the molten synthetic resin flowing through the runners may come to be injected in the cavity while the molten state thereof being still partially insufficient, i.e., fluidity thereof being partially poor. In consequence, there may arise such problems as occurrence of bubbles, pinholes and/or voids in the injected synthetic resin material, or wire sweep eventually resulting in poor package quality of the obtained products.

SUMMARY OF THE INVENTION

The present invention was made to solve the above-discussed problems and has as a principal object the provision of a novel mold for resin encapsulation molding in which synthetic resin material is first sufficiently molten in the cull section to secure a required fluidity, then the synthetic resin of required fluidity is injected in the cavity through the runners, whereby the injected synthetic resin material is prevented from occurrence of bubble, pinhole, void and/or wire sweep.

In order to accomplish the foregoing object, there is provided a mold for use in resin encapsulation molding in accordance with the invention comprising the mentioned cavity, pot, cull section and conveying passage for conveying a molten resin material, said cull section being formed facing to an open end face of the pot in which synthetic resin material is placed, characterized in that inner bottom of said cull section facing to the open end face of the pot is formed unevenly.

In the mold for use in resin encapsulation molding of above construction, the synthetic resin material placed in the pot is heated to be melted in the pot and flows into a conveying passage from the cull section, and is sent into a cavity through the conveying passage. In this process, since the inner bottom of the cull section communicates with the conveying passage for the molten synthetic resin material which, in turn, communicates with the cavity and is formed to be facing to the opening end face of the pot for receiving synthetic, resin material to be melted by heating maybe formed unevenly. The molten resin extruded out of the pot then does not directly or immediately flow in the conveying passage through the cull section as in the prior molds, but the molten resin passes through a concave passage of the cull section flowing therethough and then comes into the conveying passage. Therefore, the molten resin is heated effectively in the form of thermal conduction from convex parts on two sides and other part along the concave passage of the cull section of high temperature during passing through the concave part of the cull part, thereby being sufficiently molten to have a required fluidity. Such molten resin of required fluidity this flows in the conveying passage and is injected continuously in the cavity flowing through the conveying passage.

In the mold for use in resin encapsulation molding of above construction and function, when performing a resin encapsulation molding of a small size electrical element such as semiconductor devices, electrical parts or the like with a synthetic resin by means of the mold according to the invention, the synthetic resin material placed in the pot and molten by heating therein is effectively heated to be sufficiently molten during moving through the cull section and the synthetic resin material of such improved fluidity is injected in the cavity. Therefore, being distinct from the prior mold, the known disadvantages such as bubbles, pinholes, voids and/or wire sweep due to the injection of synthetic resin material of insufficient fluidity, can be overcome. As a result, high quality package products of small size electrical elements are now obtained, reducing remarkably the percentage of poor quality products.

Other objects, features and advantages of the invention will become apparent in the course of the following description with reference to the accompanying drawings.

BRIEF DESCRIPTION OF THE DRAWINGS

In the drawings forming a part of the present application.

DESCRIPTION OF THE PREFERRED EMBODIMENT

A preferred embodiment in accordance with the present invention is hereinafter described with reference to the drawings.

Figure 1:
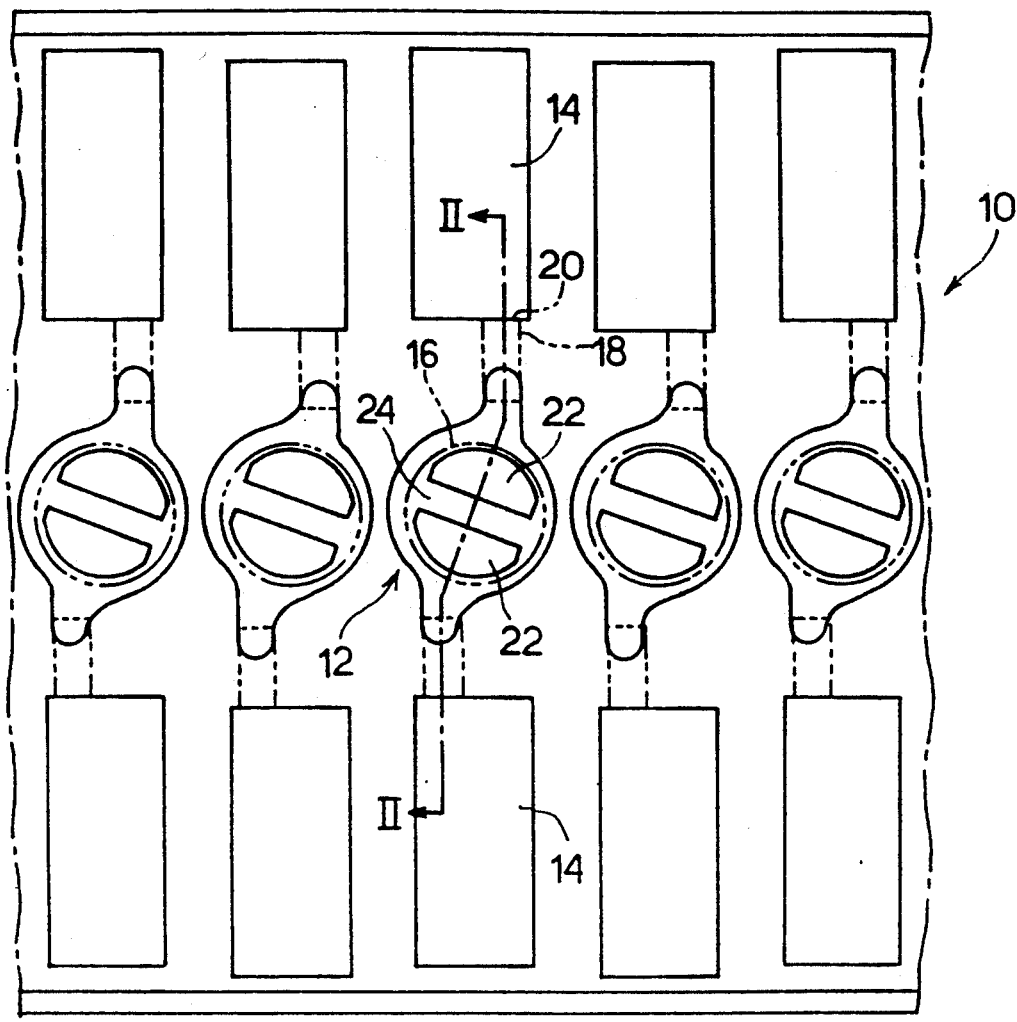
FIG. 1 is a plan view of a part of the male mold of the mold for use in resin encapsulation molding seen from a side joining to the female mold in accordance with a preferred embodiment of the present invention.
Figure 2:
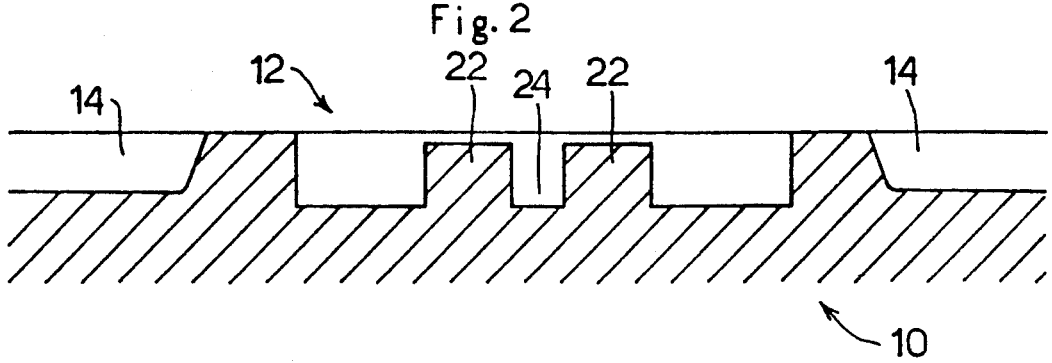
FIG. 2 is a longitudinal sectional view in the direction of the arrow taken along the line II—II of FIG. 1.

FIGS. 1 and 2 show one embodiment of the invention, and in which FIG. 1 is a plan view of a part of the male mold of the mold for resin encapsulation molding seen from a side joining to the female mold, and FIG. 2 is a longitudinal sectional view in the direction of the arrow taken along the line II—II of FIG. 1.

In the mold for resin encapsulation molding according to the preferred embodiment, there is no particular difference from the prior mold except the construction of the cull section 12 formed on the male mold 10. That is, a number of cavities 14 are formed in two rows on this male mold 10 to perform resin encapsulation molding of semiconductor, small size electrical elements with a synthetic resin material the cull section 12 is formed at an intermediate position between each pair of cavities 14, 14. In FIG. 1, the two-dot chain lines indicate locations of pots and runners formed on the female mold. Each pot 16 is formed on the female mold so as to communicate with the cull section 12. The cull section 12 and each cavity 14 are also communicated with each other through the runner 18 and the gate 20 formed on the female mold, thus forming a passage.

It is to be noted that the inner bottom of the cull section 12 is formed unevenly. To be more specific, projections 22 are formed on the inner bottom of the cull section 12, and a groove passage 24 is formed between the projections 22. Synthetic resin material is thus made molten and caused to flow in the cull section 12 is then moved flowed through this groove passage 24.

Operation for injecting such molten synthetic resin material from the pots to the cavities under pressure by means of the mold of above construction is now described with reference to FIG. 3.

Figure 3:
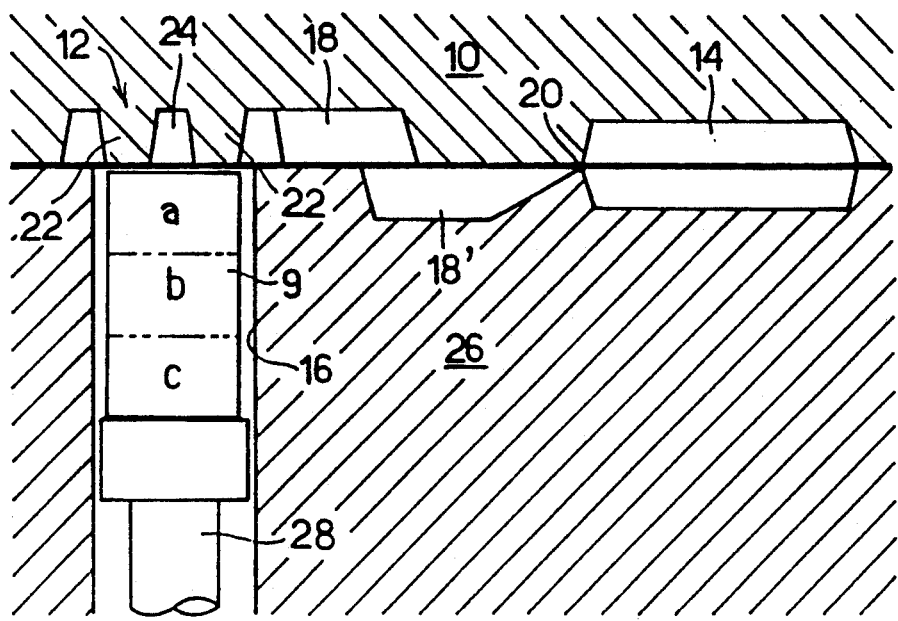
FIG. 3 is a view for explaining the operation of injecting synthetic resin material from the pot into the cavity by means of said mold for resin encapsulation molding.
Figure 8:
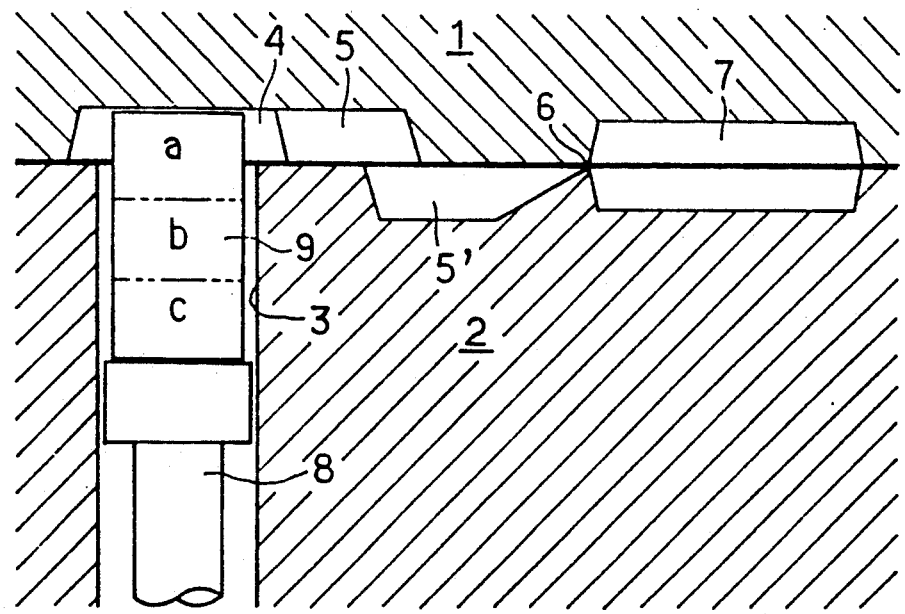
FIG. 8 is a partially enlarged longitudinal sectional view of a mold according to the prior art.

FIG. 3 is a partially enlarged longitudinal sectional view of a mold with its male mold 10 and female mold 26 clamped. When placing a resin tablet 9 in the pot 16 formed on the female mold 26, the resin tablet 9 is heated by thermal conduction from the heater embedded in the male and female mold plates not illustrated, and molten to be a fluid. The molten and fluid synthetic resin material is extruted out of the pot under pressure by means of the plunger 28, and flows in the cull section 12. The molten resin material thus moved into the cull section 12 flows through the groove passage 24 in the cull section 12 and, during such flowing movement, is effectively heated in the form of thermal conduction from the inner bottom surface of the cull section 12 and the projections on both sides of the groove passage 24. As a result of this, in the same manner as described with reference to FIG. 8, respective parts "a", "b" and "c" of the resin tablet 9 are sequentially melted stepwise in the pot 16, and even if heat to ensure fluidity of molten resin material is initially insufficient, it is augmented by heating during the step of passing through the groove passage of the cull section 12. Thereafter the molten resin material of even fluidity flows out of the cull section 12 and flows into the runners 18, 18'. Then, the molten material having sufficient fluidity further flows in the cavity by way of the runners 18, 18'. Accordingly, there are no more such problems relating to flowing or supplying of resin material of insufficient fluidity or in supplying of resin material once molten and later gelated into the cavity 14. In this manner, the molten resin material is moved through the runners 18, 18' while being sufficiently heated to keep a required fluidity, and is injected into the cavity 14 through the gate 20. Therefore, the resin curved in the cavity 14 is prevented from occurence of bubble, pinhole, void and/or wire sweep.

Figure 4:
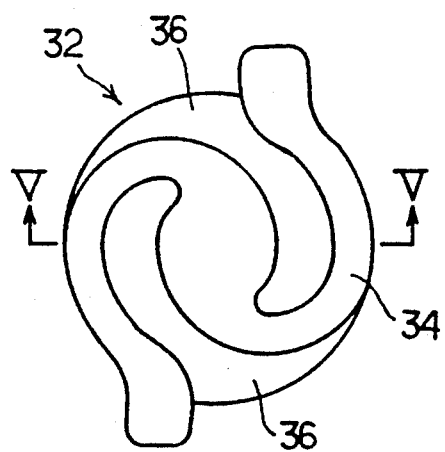
FIG. 4, 6 and 7 are respective plan views of various modifications of the groove passage of the cull section.
Figure 5:
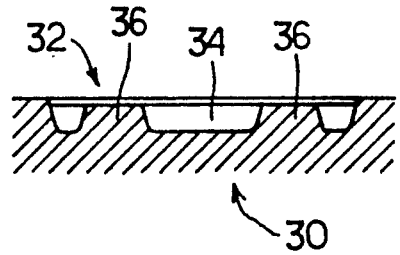
FIG. 5 is a longitudinal sectional view taken along the line V—V of FIG. 4.
Figure 6:
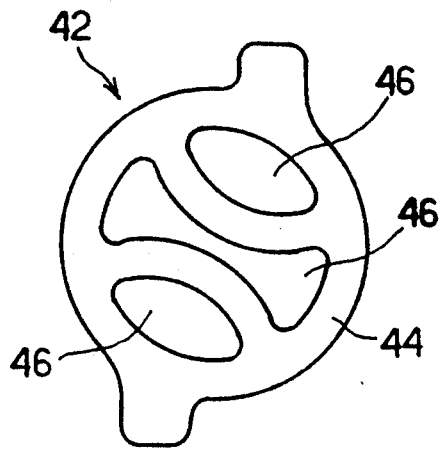
Figure 7:
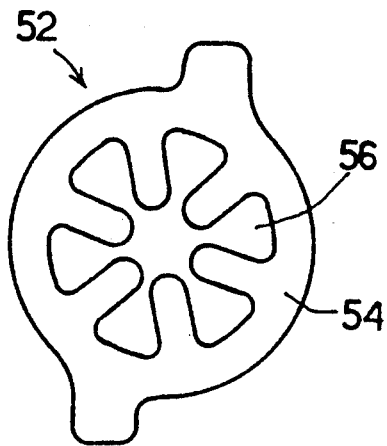

FIG. 4, 6 and 7 respectively show modifications in terms of shape of the groove passage of the cull section. In the cull section 32, 42, 52 shown in the respective drawings, numerals 36, 46, 56 denotes the projections. FIG. 5 shows a partially enlarged longitudinal sectional view of the male mold taken along the line V—V of FIG. 4. The mold for use in resin encapsulation molding of above construction according to the invention is not limited to the foregoing description and drawings, and various modification may be made within the scope of the invention without departing from the spirit of thereof. For example, although a so-called multi-pot type mold wherein a number of pots are disposed in such a manner that each pot corresponds to two cavities in the foregoing embodiment, it is also preferable that only one pot is disposed so that synthetic resin material may be injected under pressure from the pot to a plurality of cavities (i.e., a so-called conventional type mold). Further, although a mold comprising a cull section formed on the male mold and pots formed on the female mold in the foregoing embodiment, it is also preferable that pots are formed on the male mold and a cull section on the flemale mold. In addition, various shapes of groove passages may be designed other than those illustrated in the drawings.

What is claimed is:

1. Apparatus for resin encapsulation molding of small elements, comprising:
    a male mold and a cooperating female mold, defining a cavity wherein small elements to be resin encapsulated with a synthetic resin are placed for encapsulation;
    at least one pot for receiving a quantity of synthetic resin material and heat for melting said resin material therein;
    a cull formed in the male mold, said cull communicating with said at least one pot to receive melted resin therefrom;
    a plunger disposed to be movable in an axial direction of the pot, to extrude molten resin from the pot into said cavity to encapsulate said elements placed therein,
    wherein an inner bottom portion of said cull, facing an opening of said pot from which said molten resin is extruded into said cull, is provided with a continuous groove passage defined by projections providing surfaces by which heat received by thermal conduction between the molds is applied to the molten resin to ensure its fluidity as the molten resin flows through the groove in the cull into the cavity to surround and encapsulate the small elements placed therein.

2. Apparatus for resin encapsulation molding according to claim 1, wherein:
    end faces of said projections are formed to be flat, and the heights of the projections are each almost equal to the depth of the groove passage and to a distance from a principal surface of the male mold to the bottom of the groove passage.

3. Apparatus for resin encapsulation molding according to claim 1, wherein:
    said groove passage of the cull comprises an annular groove formed along a peripheral edge of the cull and a plurality of linear grooves each formed through the center part of the cull and disposed to have its respective ends joining said annular groove.

4. Apparatus for resin encapsulation molding according to claim 1, wherein:
    said groove passage of the cull is a continuous curved groove.

5. Apparatus for resin encapsulation molding according to claim 1, wherein:
    said groove passage of the cull comprises an annular groove formed along a peripheral edge of the cull and a plurality of curved grooves each disposed to have its respective ends joining said annular groove.

6. Apparatus for resin encapsulation molding according to claim 1, wherein:
    said groove passage comprises an annular groove formed along a peripheral edge of the cull, and a plurality of linear grooves arranged radially thereof and joining said annular groove at their respective external ends.

7. Apparatus for resin encapsulation molding according to claim 1, wherein:
    a number of pots are provided on the female mold, and two cavities are arranged to correspond to each of the pots.

8. Apparatus for resin encapsulation molding according to claim 1, wherein:
    only one pot is provided on the female mold so that synthetic resin material may be injected into other pots therefrom under pressure.

9. Apparatus for resin encapsulation molding according to claim 2, wherein:
    said groove passage of the cull is a continuous curved groove.

10. Apparatus for resin encapsulation molding according to claim 2, wherein:
    said groove passage of the cull comprises an annular groove formed along a peripheral edge of the cull and a plurality of curved grooves each disposed to have its respective ends joining said annular groove.

11. Apparatus for resin encapsulation molding according to claim 2, wherein:
    said groove passage comprises an annular groove formed along a peripheral edge of the cull, and a plurality of linear grooves arranged radially thereof and joining said annular groove at their respective external ends.

* * * * *